United States Patent
Lee et al.

(10) Patent No.: US 8,584,190 B2
(45) Date of Patent: Nov. 12, 2013

(54) APPARATUS AND METHOD FOR TRANSMITTING/RECEIVING DATA IN COMMUNICATION SYSTEM

(75) Inventors: Bong-Ho Lee, Daejeon (KR); Hyun Lee, Daejeon (KR); Gwang-Soon Lee, Daejeon (KR); Yong-Hoon Lee, Daejeon (KR); Namho Hur, Daejeon (KR); Kwanghee Jung, Gyeonggi-do (KR); Soo-In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 123 days.

(21) Appl. No.: 13/173,557

(22) Filed: Jun. 30, 2011

(65) Prior Publication Data

US 2012/0005715 A1 Jan. 5, 2012

(30) Foreign Application Priority Data

Jun. 30, 2010 (KR) .................. 10-2010-0062542

(51) Int. Cl.
*H04N 7/173* (2011.01)
(52) U.S. Cl.
USPC ............. 725/118; 725/91; 725/100; 725/114; 725/131; 725/138; 725/139; 348/42; 348/43; 348/51
(58) Field of Classification Search
USPC ........... 725/91, 100, 114, 118, 131, 138–139; 348/42–43, 51
See application file for complete search history.

(56) References Cited

U.S. PATENT DOCUMENTS

| 7,555,767 | B2 | 6/2009 | Takagi et al. |
| 2008/0310499 | A1* | 12/2008 | Kim et al. ............. 375/240.01 |
| 2009/0202075 | A1* | 8/2009 | Vince et al. ................ 380/269 |
| 2011/0149040 | A1* | 6/2011 | Klebanov et al. ........... 348/46 |
| 2011/0261158 | A1* | 10/2011 | Suh et al. .................... 348/43 |
| 2012/0019619 | A1* | 1/2012 | Suh et al. .................... 348/43 |

FOREIGN PATENT DOCUMENTS

| EP | 2200307 A2 | 6/2010 |
| KR | 1999-0060127 | 7/1999 |
| KR | 10-2008-0051004 | 6/2008 |
| KR | 1020100048355 | 5/2010 |
| KR | 10-2010-0067591 | 6/2010 |

\* cited by examiner

*Primary Examiner* — Mulugeta Mengesha
(74) *Attorney, Agent, or Firm* — Nelson Mullins Riley & Scarborough LLP

(57) ABSTRACT

Provided is an apparatus and method for transmitting and receiving broadcasting data and supplementary data. The method includes: generating broadcasting data and supplementary data for a plurality of predetermined 3D broadcasting services to be provided to users; multiplexing the generated broadcasting data for broadcasting channels respectively allocated to the plurality of predetermined 3D broadcasting services, and multiplexing the generated supplementary data for one commonly broadcasting channel commonly allocated to the plurality of predetermined 3D broadcasting services; encoding the multiplexed supplementary data corresponding to a conditional access system; and transmitting the encoded supplementary data to the one common broadcasting channel, and transmitting the multiplexed broadcasting data to the allocated broadcasting channels.

20 Claims, 7 Drawing Sheets

APPARATUS AND METHOD FOR TRANSMITTING/RECEIVING DATA IN COMMUNICATION SYSTEM

CROSS-REFERENCE TO RELATED APPLICATIONS

The present application claims priority of Korean Patent Application No. 10-2010-0062542, filed on Jun. 30, 2010, which is incorporated herein by reference in its entirety.

BACKGROUND OF THE INVENTION

1. Field of the Invention

Exemplary embodiments of the present invention relate to a communication system; and, more particularly, to an apparatus and method for transmitting and receiving broadcasting data and supplementary data thereof to provide a high quality 3D broadcasting service in various types in a digital broadcasting system.

2. Description of Related Art

There have many studies actively made to provide services with various Quality of Services (QoS) at a high transmit rate in a communication system. For example, a digital broadcasting system has introduced methods for transmitting various types of video and audio data at a high transmit rate through a limited resource. The digital broadcasting system has been advanced to provide various types of high quality broadcasting services to uses. For example, a 3D broadcasting service has been receiving attention. Accordingly, many researches and studies have been actively made to provide various types of 3D broadcasting services.

In order to provide a 3D broadcasting service, a digital broadcasting system transmits and receives broadcasting data including primary broadcasting images and a supplementary data including supplementary images for the primary broadcasting images. Such primary broadcasting data and supplementary data are transmitted or received through the same broadcasting channel or through different broadcasting channels. In other word, the digital broadcasting system transmits and receives a broadcasting data including 2D images as primary broadcasting images and a supplementary data including supplementary images for transforming the primary broadcasting images to 3D images. The digital broadcasting system multiplexes the broadcasting data and the supplementary data and transmits the multiplexed data through the same broadcasting channel or through different broadcasting channels.

Meanwhile, the digital broadcasting system adopts a conditional access system (CAS) for conditional access of a predetermined broadcasting service or a broadcasting service program. When such a digital broadcasting system adopting the conditional access system transmits the broadcasting data and the supplementary data through the same broadcasting channel or through different broadcasting channels, only subscribed users for corresponding broadcasting service or broadcasting service programs such as a 3D broadcasting service can access the broadcasting data and the supplementary data from the digital broadcasting system.

Since the broadcasting channels for transmitting the broadcasting data and supplementary data are limited, it is required to develop a method for effectively providing various types of high quality broadcasting services such as various forms of 3D broadcasting services using such limited broadcasting channels. In other words, transmitters for providing various 3D broadcasting services transmit broadcasting data and supplementary data through corresponding broadcasting channels. Here, the transmitter may be a broadcasting service provider or a broadcasting station. Such transmitters adopt the conditional access system (CAS) and transmit the broadcasting data and the supplementary data corresponding to the CAS. Accordingly, uses can receive only 3D broadcasting services that the users subscribe among various 3D broadcasting services.

Demand of users to receive various high quality 3D broadcasting services from the digital broadcasting system adapting the CAS has been increased. In order to satisfy such demand, a plurality of transmitters try to provide various forms of 3D broadcasting services by adapting the CAS. However, there is a limitation to provide various high quality 3D broadcasting services using the plurality of transmitters adopted with the CAS because of the limitation of the broadcasting channel.

Therefore, there has been a demand for developing a method for transmitting and receiving data in order to effectively provide various types of 3D broadcasting services through limited broadcasting channels in a digital broadcasting system having a CAS.

SUMMARY OF THE INVENTION

An embodiment of the present invention is directed to an apparatus and method for transmitting and receiving broadcasting data in a communication system.

Another embodiment of the present invention is directed to an apparatus and method for providing various types of high quality digital broadcasting services in a communication system.

Still another embodiment of the present invention is directed to an apparatus and method for transmitting and receiving broadcasting data and supplementary data thereof to provide various types of high quality 3D broadcasting services to users from a digital broadcasting system.

Yet another embodiment of the present invention is directed to an apparatus and method for transmitting and receiving data to effectively provide various types of high quality 3D broadcasting services by interworking with limited broadcasting channels in a digital broadcasting system having a conditional access system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for transmitting data in a communication system includes: a plurality of primary source units each configured to generate broadcasting data for corresponding one of predetermined 3D broadcasting services to be provided to a user; supplementary source units configured to generate supplementary data for each one of the predetermined 3D broadcasting services; a plurality of first multiplexers each configured to multiplex corresponding one of the generated broadcasting data for a corresponding broadcasting channel allocated to corresponding one of the predetermined 3D broadcasting services; a second multiplexer configured to multiplex the generated supplementary data for one common broadcasting channel commonly allocated to the predetermined 3D broadcasting services; an encoder configured to encode the multiplexed supplementary data corresponding to a conditional access system; a plurality of first transmitters each configured to transmit corresponding one of the multiplexed broadcasting data to corresponding one of the allocated broadcasting channels; and a second transmitter configured to transmit the encoded supplementary data to the one common broadcasting channel.

In accordance with another embodiment of the present invention, an apparatus for receiving data in a communication system, includes: a first Radio Frequency (RF) tuner configured to receive broadcasting data transmitted from a broadcasting channel allocated to corresponding one of predetermined 3D broadcasting services to be provided to a user; a second RF tuner configured to receive supplementary data transmitted from one common broadcasting channel commonly allocated for the predetermined 3D broadcasting services; a first processor configured to encode the received supplementary data corresponding to a conditional access system; a first demultiplexer configured to demultiplex the received broadcasting data; a second demultiplexer configured to demultiplex the decoded supplementary data; a plurality of decoders configured to decode the demultiplexed broadcasting data and the demultiplexed supplementary data; and a second processor configured to integrally process the decoded broadcasting data and the decoded supplementary data.

In accordance with another embodiment of the present invention, a method for transmitting data in a communication system, includes: generating broadcasting data and supplementary data for a plurality of predetermined 3D broadcasting services to be provided to users; multiplexing the generated broadcasting data for broadcasting channels respectively allocated to the plurality of predetermined 3D broadcasting services, and multiplexing the generated supplementary data for one commonly broadcasting channel commonly allocated to the plurality of predetermined 3D broadcasting services; encoding the multiplexed supplementary data corresponding to a conditional access system; and transmitting the encoded supplementary data to the one common broadcasting channel, and transmitting the multiplexed broadcasting data to the allocated broadcasting channels.

In accordance with another embodiment of the present invention, a method for receiving data in a communication system, includes: receiving broadcasting data transmitted from broadcasting channels respectively allocated to a plurality of predetermined 3D services to be provided to users, and receiving supplementary data transmitted through one common broadcasting channel for the 3D broadcasting services; restoring the received supplementary data corresponding to a conditional access system; demultiplexing the received broadcasting data and the restored supplementary data; and decoding the demultiplexed broadcasting data and supplementary data, and providing the plurality of 3D broadcasting services by integrally processing the decoded broadcasting data and supplementary data.

DESCRIPTION OF SPECIFIC EMBODIMENTS

Figure 1:
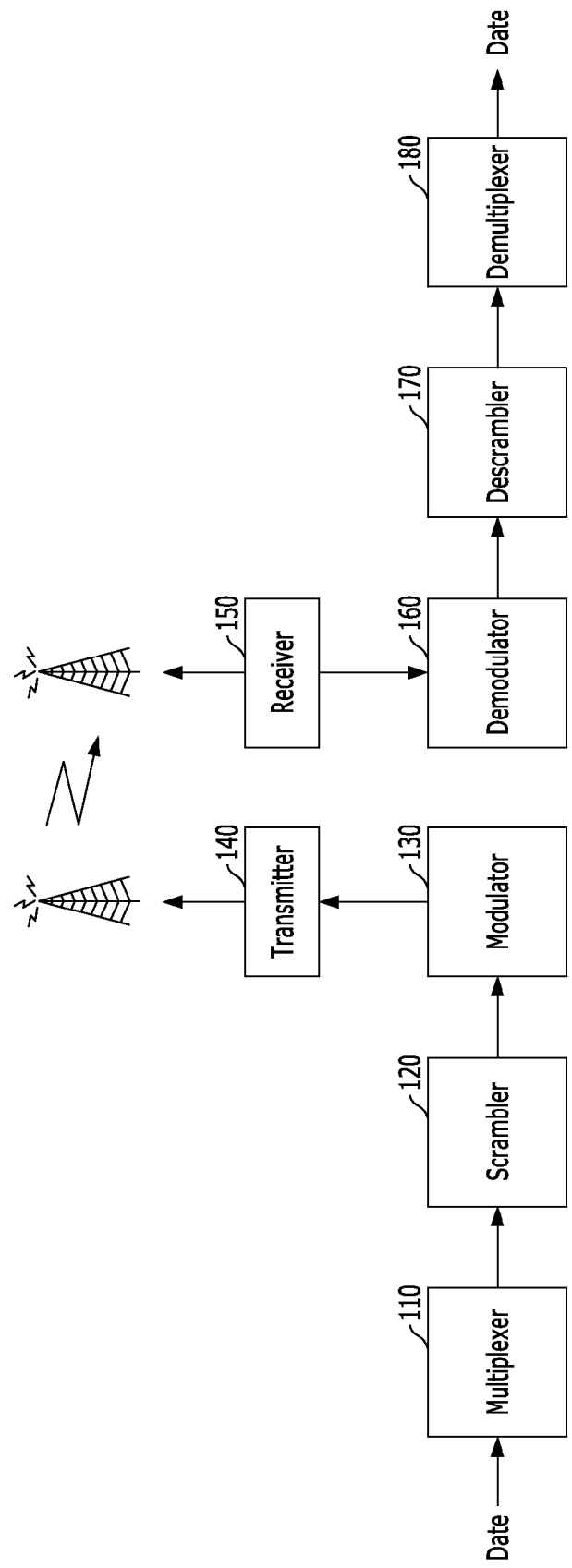
FIG. 1 is a diagram schematically illustrating a structure of a communication system in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

The present invention relates to an apparatus and method for transmitting and receiving broadcasting data in a digital broadcasting system. In order to provide various types of high quality 3D broadcasting services, an apparatus and method for transmitting and receiving broadcasting data in accordance with an embodiment of the present invention transmits broadcasting data including 2D images as primary broadcasting image and supplementary data including supplementary image for the primary broadcasting image such as supplementary images for converting the 2D images to 3D images through a limited broadcasting channel, and receives the broadcasting data and the supplementary data transmitted through the broadcasting channel to receives a 3D broadcasting service. In an embodiment of the present invention, the digital broadcasting system transmits the broadcasting data and the supplementary data through a limited broadcasting channel by adopting a conditional access system (CAS) in order to allow only a subscribed user to receive a predetermined broadcasting service or a predetermined service program such as a corresponding 3D broadcasting service. Here, the digital broadcasting system provides various types of 3D broadcasting service by transmitting broadcasting data and supplementary data through interworking with a broadcasting channel.

In a digital broadcasting system according to an embodiment of the present invention, a plurality of transmitters provide various types of 3D broadcasting service. Such transmitter may be a plurality of broadcasting service providers such as broadcasting stations. The transmitters transmit broadcasting data and supplementary data corresponding to each one of 3D broadcasting services. Each one of the transmitters transmit the broadcasting data and the supplementary data by interworking with a broadcasting channel transmitting the broadcasting data of each transmitter and interworking with a broadcasting channel transmitting supplementary data of each transmitter. In the embodiment of the present invention, a plurality of supplementary data of the transmitters are multiplexed for one common broadcasting channel and transmitted through the one common broadcasting channel. A plurality of broadcasting data for the transmitters are respectively multiplexed for corresponding broadcasting channels and transmitted through the corresponding broadcasting channels. Since the broadcasting data and the supplementary data are transmitted through interworking with one common broadcasting channel, the user of limited broadcasting channel is maximized, and various types of 3D broadcasting services are effectively provided. Hereinafter, a digital broadcasting system in accordance with an embodiment of the present invention will be described with reference to FIG. 1.

FIG. 1 is a diagram schematically illustrating a structure of a communication system in accordance with an embodiment of the present invention. Here, FIG. 1 schematically illustrates a structure of a digital broadcasting system providing a broadcasting service by adapting a conditional access scheme in a communication system in accordance with an embodiment of the present invention.

Referring to FIG. 1, the digital broadcasting system includes a transmitting apparatus as a service provider for providing a 3D broadcasting service and a receiving apparatus for receiving the 3D broadcasting service and providing the received 3D broadcasting service to a user. The transmitting apparatus includes a multiplexer 110 for multiplexing broadcasting data and supplementary data, a scrambler 120 for scrambling the multiplexed data, a modulator 130 for modulating the scrambled data, and a transmitter 140 for transmitting the modulated data using an antenna through a broadcasting channel. The receiving apparatus includes a receiver 150 for receiving data transmitted through a broadcasting channel using an antenna, a demodulator 160 for demodulating the received data, a descrambler 170 for descrambling the demodulated data, and a demultiplexer 180 for restoring the received data to broadcasting data and supplementary data by demultiplexing the descrambled data.

The multiplexer 110 receives broadcasting data and supplementary data corresponding to a 3D broadcasting service provided from the transmitting apparatus. Here, the broadcasting data includes 2D images as primary broadcasting images and the supplementary data includes supplementary images for producing 3D images based on the 2D images. Then, the multiplexer 110 multiplexes the received broadcasting data and supplementary data and outputs the multiplexed data as a transport stream (TS) to the scrambler 120. The scrambler 120 scrambles the TS according to the conditional access system and transmits the scrambled data through a broadcasting channel after processing the scrambled data in the modulator 130 and the transmitter 140. The receiver 150 receives the scrambled data transmitted from the transmitting apparatus through the broadcasting channel. The received data is input to the descrambler 170 through the demodulator 160. The descrambler 170 restores the scrambled data by descrambling the scrambled data and transmits the descrambled TS to the demultiplexer 180. The demultiplexer 180 provides the 3D broadcasting service to a user.

Such a digital broadcasting system adapts a conditional access system (CAS) to only allow a subscribed user to receive a corresponding broadcasting service. Accordingly, the scrambler 120 of the transmitting apparatus uses a control word to scramble data, and the descrambler 170 of the receiving apparatus uses a control word to restore the scrambled data. Here, in the digital broadcasting system, the transmitting apparatus transmits an entitlement control message (ECM) and an entitlement management message (EMM) by the control access system (CAS) in order to only allow a subscribed receiver to restore broadcasting data and supplementary data to receive a 3D broadcasting service.

The ECM is a cryptogram message for the control word and an access condition of a corresponding broadcasting service. The ECM controls the descramble operation of the descrambler 170 of the receiving apparatus. The EMM is a message for assigning a descrambling right of the broadcasting data and the supplementary data for a corresponding broadcasting service by a user. The EMM controls a descrambling operation of the descrambler 170 of the receiving apparatus. Is such a digital broadcasting system, the transmitting apparatus scrambles the broadcasting data and the supplementary data using a control word using the CAS, transmits the scrambled broadcasting and supplementary data, an ECM, and an EMM. Then, the receiving apparatus restores the scrambled broadcasting and supplementary data by processing the ECM and the EMM to provide a 3D broadcasting service to a subscribed user. Hereinafter, a transmitting apparatus of a digital broadcasting system in accordance with an embodiment of the present invention will be described with reference to FIG. 2.

Figure 2:
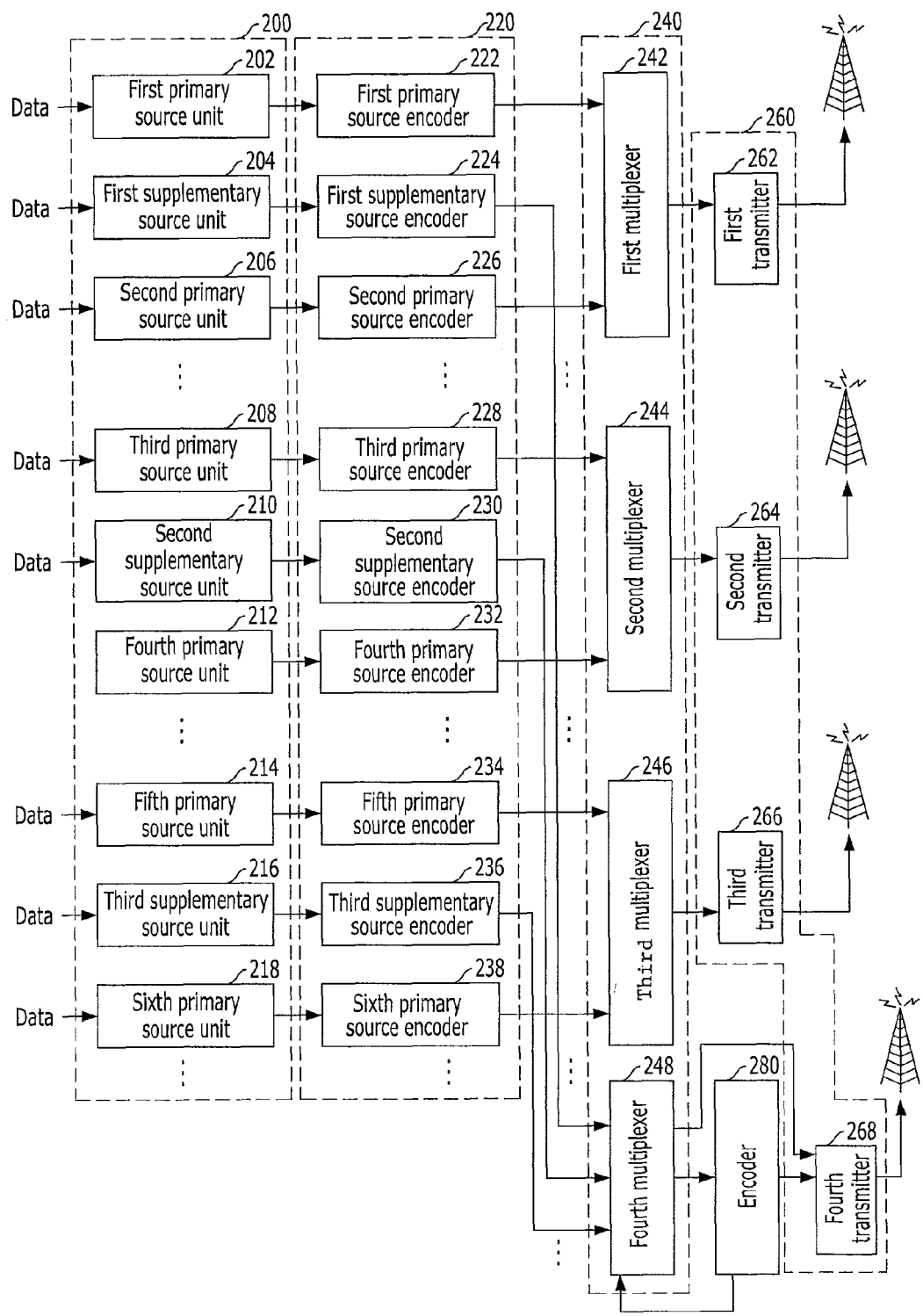
FIG. 2 is a diagram schematically illustrating a structure of a transmitting apparatus in a communication system in accordance with an embodiment of the present invention.

FIG. 2 is a diagram schematically illustrating a structure of a transmitting apparatus in a communication system in accordance with an embodiment of the present invention. Here, FIG. 2 illustrates a digital communication system including a plurality of transmitters for providing various types of 3D broadcasting services in accordance with an embodiment of the present invention.

Referring to FIG. 2, the digital broadcasting system includes a plurality of transmitting apparatuses to provide various types of 3D broadcasting services. Such transmitting apparatuses may be a plurality of broadcasting service providers. Each transmitting apparatus includes a source unit 200 for generating broadcasting data including 2D images as primary broadcasting images and supplementary data including supplementary images for the primary images to produce 3D images, a source encoder 220 for encoding the generated broadcasting and supplementary data from the source unit 200, a multiplexer 240 for multiplexing the encoded broadcasting and supplementary from the source encoder 220, an encoder 280 for encoding the multiplexed supplementary data from the multiplexer 240 corresponding to the conditional access system, and a transmitter 280 for transmitting the multiplexed broadcasting data from the multiplexer 240 and the encoded supplementary data corresponding to the conditional access system from the encoder 280.

The source unit 200 includes primary source units for generating broadcasting data including primary broadcasting image corresponding to a target broadcasting service or a target broadcasting service program such as a 3D broadcasting service and supplementary source units for generating supplementary data having supplementary image for the generated primary broadcasting image. The primary source unit includes a first primary source unit 202, a second primary source unit 206, a third primary source unit 208, a fourth primary source unit 212, a fifth primary source unit 214, and a sixth primary source unit 218. Further, the supplementary source unit includes a first supplementary source unit 204, a second supplementary source unit 210, and a third supplementary source unit 216. Here, the broadcasting data including primary broadcasting image generated from the primary source units 202, 206, 208, 212, 214, and 218 is data including 2D images as primary broadcasting images. In case of a 3D broadcasting service, the broadcasting data may be image data of a left viewpoint (or a right viewpoint) which is 2D image data. The supplementary data generated from the supplementary source units 204, 210, and 216 is supplementary image for providing a 3D broadcasting image when the transmitting apparatuses provide various types of 3D broadcasting services. For example, the supplementary data is image data for a right viewpoint (or a left viewpoint) when the primary image data is a image data of a left viewpoint (or right viewpoint).

The source encoder 220 includes primary source encoders corresponding to the primary source units 202, 206, 208, 212, 214, and 218 of the source unit 200. For example, the primary source encoders includes a first primary source encoder 222, a second primary source encoder 226, a third primary source encoder 228, a fourth primary source encoder 235, a firth primary source encoder 234, and a sixth primary source encoder 238. The source encoder 220 further includes supplementary source encoders corresponding to the supplementary source units 204, 210, and 216. For example, the supplementary source encoders includes a first supplementary source encoder 224, a second supplementary source encoder 230, and a third supplementary source encoder 236. Here, the primary source encoders 222, 226, 228, 232, 234, and 238 and the supplementary source encoders 224, 230, and 236 encode the generated broadcasting and supplementary data from the primary source units 202, 206, 208, 212, 214, and 218 and the supplementary source units 204, 210, and 216 using CODEC. The primary source encoders 222, 226, 228, 232, 234, and 238 and the supplementary source encoders 224, 230, and 236 use independent CODEC to encode or use dependent CODEC such as a multi-view coding scheme (MVC) or a scalable video coding scheme (SVC) to encode when the broadcasting data is 2D image data for a left viewpoint and the supplementary data is 2D image data for a right viewpoint to provide a 3D broadcasting service. For example, the primary source encoders 222, 226, 228, 232, 234, and 238 may be a MPEG-2 encoder for guaranteeing reverse direction compatibility, and the supplementary source encoders 224, 230, and 236 may be a MPEG-4 AVC encoder having superior compression rate.

The multiplexer 240 includes multiplexers for multiplexing the encoded broadcasting data from the primary source encoders 222, 226, 228, 232, 234, and 238 for a broadcasting channel allocated to each transmitting apparatus. For example, the multiplexers include a first multiplexer 242, a second multiplexer 244, and a third multiplexer 246. Further, the multiplexer 240 includes a fourth multiplexer 248 for multiplexing the encoded supplementary data from the supplementary source encoders 224, 230, and 236 for one common broadcasting channel. Here, the first multiplexer 242, the second multiplexer 244, and the third multiplexer 246 multiplex transport streams received from the primary source encodes 222, 226, 228, 232, 234, and 238 for broadcasting channels allocated to each broadcasting service provider to a single transport stream. The fourth multiplexer 248 multiplexes transport streams of encoded supplementary data from the supplement source encoders 224, 230, and 236 of all broadcasting service providers to a single transport stream. In order words, the fourth multiplexer 248 integrally multiplexes all supplementary data for all 3D broadcasting services to be provided in the digital broadcasting system. Accordingly, the digital broadcasting system in accordance with an embodiment of the present invention adapts the conditional access system to allow only a subscribed user to receive a corresponding broadcasting service such as a 3D broadcasting service, multiplexes each primary broadcasting video of transmitting apparatus for a corresponding broadcasting channel, and multiplexes all supplementary data of the transmitting apparatus for one common broadcasting channel. The encoder 280 encodes the multiplexed supplementary data from the fourth multiplexer 240 corresponding to the conditional access system. Hereinafter, the encoder 280 will be described in more detail with reference to FIG. 3.

The transmitter 260 includes a plurality of transmitters for transmitting the multiplexed broadcasting data from the multiplexers 242, 244, and 246 to a corresponding broadcasting channel after channel encoding and modulation. For example, the transmitter 260 includes a first transmitter 262, a second transmitter 264, and a third transmitter 266. Further, the transmitter 260 includes a fourth transmitter 268 for channel encoding, modulating, and transmitting the encoded supplementary data corresponding to the conditional access system to the one common broadcasting channel. Here, the fourth transmitter 268 is an integral transmitting device for integrating supplementary data including supplement images of all providers and transmitting the integrated supplementary data through one common channel. The fourth transmitter 268 interworks with the broadcasting channels allocated to each transmission. The one common broadcasting channel transmitting the supplementary data may be a network identical to a broadcasting channel allocated to transmitters or a network different from the broadcasting channel, such as an Internet Protocol Television (IPTV) network.

In order to provide various types of 3D broadcasting services by applying a conditional access system, the digital broadcasting system in accordance with an embodiment of the present invention multiplexes broadcasting data for each allocated broadcasting channel and transmits the multiplexed broadcasting data through a corresponding broadcasting channel. Here, the broadcasting data includes 2D images as primary broadcasting images such as a left viewpoint image of each one of the 3D broadcasting services. Further, the digital broadcasting system in accordance with an embodiment of the present invention multiplexes supplementary data including supplementary images such as a right viewpoint image of 3D broadcasting for one common broadcasting channel and transmits the multiplexed supplementary data to one common broadcasting channel. That is, the digital broadcasting system separately multiplexes the broadcasting data and the supplementary data for each one of the 3D broadcasting services. The supplementary data is multiplexed for one common broadcasting channel, and the broadcasting data is multiplexed for each broadcasting channel allocated to provide each corresponding one of the 3D broadcasting services. The receiving apparatus of the digital broadcasting system in accordance with an embodiment of the present invention receives the broadcasting data and the supplementary data from the broadcasting channel and the common broadcasting channel and provides the 3D broadcasting service to users. Hereinafter, the multiplexing and encoding of the supplementary data in the digital broadcasting system in accordance with an embodiment of the present invention will be described with reference to FIG. 3.

Figure 3:
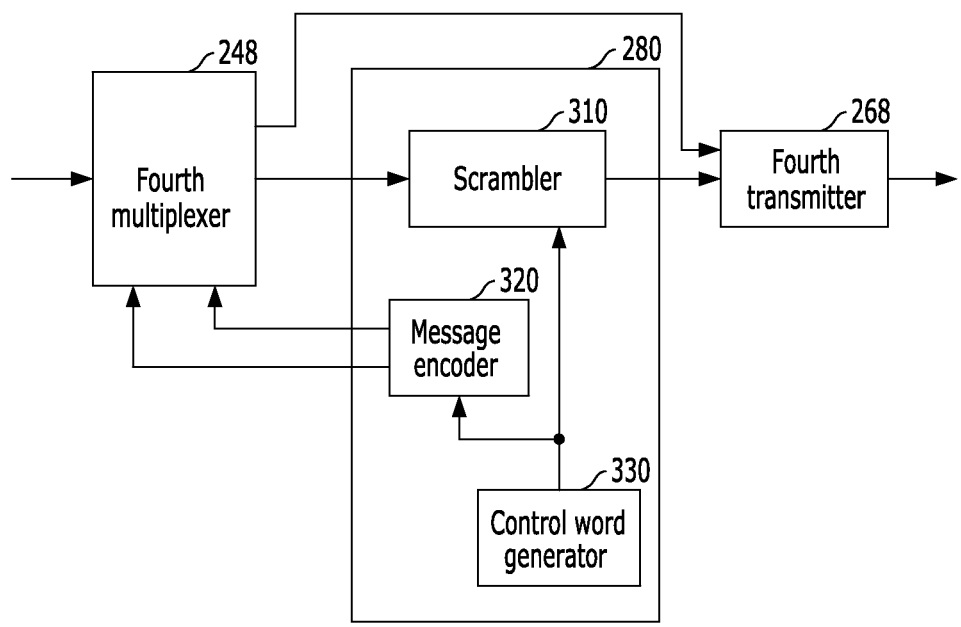
FIG. 3 is a diagram illustrating a supplementary data processor of a transmitting apparatus in a communication system in accordance with an embodiment of the present invention.

FIG. 3 is a diagram illustrating a supplementary data processor of a transmitting apparatus in a communication system in accordance with an embodiment of the present invention. That is, FIG. 3 illustrates the fourth multiplexer 248, the encoder 280, and the fourth transmitter 268 as the supplementary data processor that multiplexes supplementary data of all 3D broadcasting services for one common broadcasting channel when various types of 3D broadcasting services are provided by applying a conditional access system in a digital broadcasting system in accordance with an embodiment of the present invention.

Referring to FIG. 3, the supplementary data processor include the fourth multiplexer 248 for multiplexing supplementary data of all 3D broadcasting services provided from the digital broadcasting system for one common broadcasting channel, the encoder 280 for encoding the multiplexed supplementary data corresponding to the conditional access system, and the fourth transmitter 268 for encoding and modulating the encoded supplementary data and transmitting the modulated supplementary data to the one common broadcasting channel.

The encoder 280 includes a control word generator 320 for generating a control word for encoding data corresponding to the conditional access system, a message encoder 330 for encoding the ECM and the EMM corresponding to the generated control word, and a scrambler 310 for scrambling the multiplexed supplementary data from the fourth multiplexer 248 using the generated control word from the control word generator 320.

The control word generator 320 generates a control word for each supplementary data generated from the supplementary source units 204, 210, and 216 in order to allow only a subscribed user to receive a corresponding 3D broadcasting service when the transmitting apparatus in accordance with an embodiment of the present invention provides a broadcasting service to the receiving apparatus by applying the conditional access system. That is, the control word generator 320 respectively generates control words corresponding to the generated supplementary data from the supplementary source units 204, 210, and 216. Further, the ECM and the EMM are generated corresponding to the generated control words from the control word generator 320.

That is, the message encoder 330 generates an ECM and an EMM based on the control words generated corresponding to the supplementary data of the supplementary source units 204, 210, and 216 and based on the service subscribing authentication information of a user who wants to receive a corresponding broadcasting service such as a 3D broadcasting service. Here, the ECM and the EMM are generated and encoded corresponding to the supplementary data of the supplementary source units 204, 210, and 216. The encoded ECM and EMM are multiplexed by the fourth multiplexer 248 for one common broadcasting channel that transmits the supplementary data. The fourth transmitter transmits the multiplexed ECM and EMM through the one common broadcasting channel.

The multiplexed supplementary data is transmitted from the fourth multiplexer 248 to the scrambler 310. The scrambler 310 encodes the multiplexed supplementary data using the control word. The encoded supplementary data is transmitted by the fourth transmitter 268 through the one common broadcasting channel. The fourth transmitter 268 transmits the encoded supplementary data coded corresponding to the control word by the scrambler 310 and the ECM and EMM multiplexed for one common channel by the fourth multiplexer 248 to the one common channel. Here, the ECM and EMM are used for user authentication and control word restoration when the supplementary data is descrambled to provide the 3D broadcasting service at the receiving apparatus. Hereinafter, the receiving apparatus of the digital broadcasting system in accordance with an embodiment of the present invention will be described with reference to FIG. 4.

Figure 4:
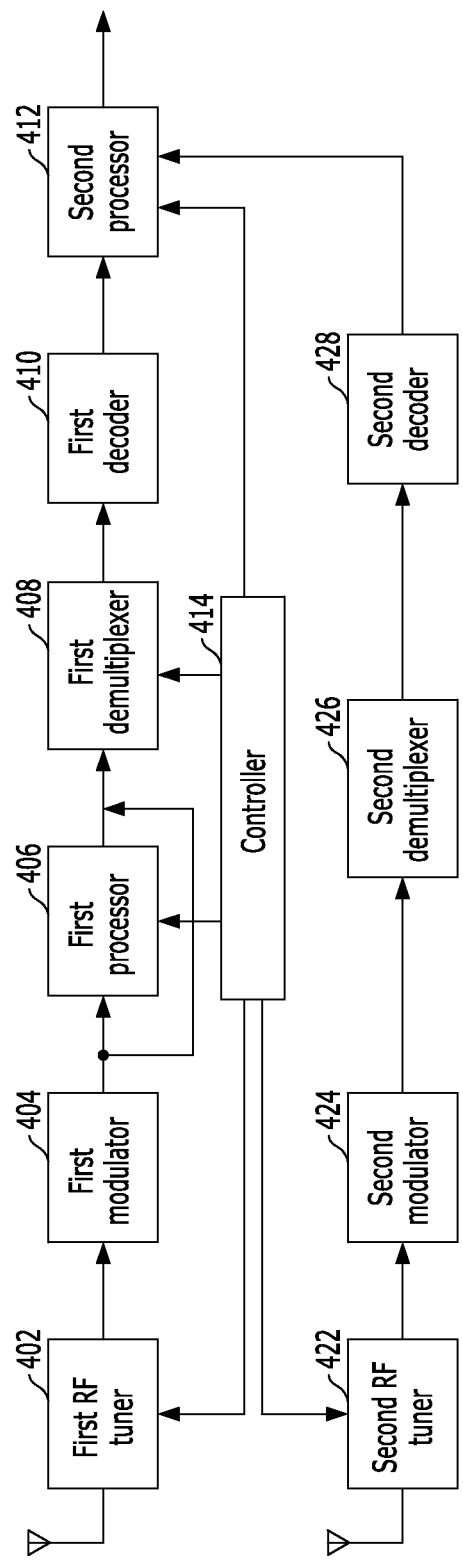
FIG. 4 is a diagram schematically illustrating a structure of a receiving apparatus in a communication system in accordance with an embodiment of the present invention.

FIG. 4 is a diagram schematically illustrating a structure of a receiving apparatus in a communication system in accordance with an embodiment of the present invention. Here, FIG. 4 schematically illustrates a structure of a receiving apparatus for providing a 3D broadcasting service to a user by receiving broadcasting data and supplementary data of the 3D broadcasting service when various types of 3D broadcasting services are provided by applying a conditional access system in a digital broadcasting system of a communication system in accordance with an embodiment of the present invention.

Referring to FIG. 4, the receiving apparatus includes a supplementary data receiving module and a broadcasting data receiving module. The supplementary data receiving modulate receives and processes supplementary data transmitted through one common broadcasting channel. The broadcasting data receiving module receives and processes the broadcasting data transmitted through a broadcasting channel allocated for providing a 3D broadcasting service.

The supplementary data receiving module includes a first RF tuner 402 for receiving supplementary data transmitted through the common broadcasting channel using an antenna, a first modulator 404 for modulating supplementary data received from the first RF tuner 402, a first processor 406 for restoring the modulated supplementary data from the first modulator 404 corresponding to the conditional access system, a demultiplexer 408 for demultiplexing the restored supplementary data from the first processor 406, the first decoder 410 for decoding the demultiplexed supplementary data from the demultiplexer 408, a second processor 412 for providing a 3D broadcasting service to a user by integrally processing the decoded supplementary data from the first decoder 410 and the decoded broadcasting data from the second decoder 428, and a controller 414 for controlling reception of the supplementary data and the broadcasting data.

The broadcasting data receiving module includes a second RF tuner 422 for receiving broadcasting data transmitted through a corresponding broadcasting channel using an antenna, a second demodulator 424 for demodulating the received broadcasting data from the second RF tuner 422, a second demultiplexer 426 for demultiplexing the demodulated broadcasting data from the second demultiplexer 424, and a second decoder 428 for decoding the demultiplexed broadcasting data from the demultiplexer 426.

Here, the first processor 406 performs related operation corresponding to the operation of encoding and scrambling the supplementary data using a control word in a plurality of transmitters. Then, the processor 406 restores the encoded and scrambled supplementary data from the transmitters to original supplementary data. The first processor 406 will be described in more detail with reference to FIG. 5.

The decoded supplementary data from the first decoder 410 may be supplementary image data such as right viewpoint image data or depth information data for providing a 3D broadcasting service to a user. The decoded broadcasting data from the second decoder 428 may be 2D image data such as left viewpoint image data for providing a 3D broadcasting service to a user. The second processor 412 provides a 3D broadcasting service to a user by integrating right viewpoint data or depth information data with 2D image data or left viewpoint image data.

The controller 414 controls integral reception of the broadcasting channel for the broadcasting data and the communication broadcasting channel for the supplementary data. The controller 414 also receives Program Specific Information/Service Information (PSI/SI) to confirm channel information and multiplexing information. Further, the controller 414 controls an operation of receiving supplementary data and broadcasting data in a receiving apparatus using the channel information and the multiplexing information. Moreover, the controller 414 controls receiving of broadcasting data transmitted through a broadcasting channel corresponding to a service request of a user who wants to receive a 3D broadcasting service, thereby providing the 3D broadcasting service that the user wants.

As described above, a plurality of transmitters providing various 3D broadcasting services by applying a condition access system in a digital broadcasting system in accordance with an embodiment of the present invention separately process each broadcasting data for each 3D broadcasting service and supplementary data for all 3D broadcasting services and transmits the processed broadcasting data and the processed supplementary data through the corresponding broadcasting channel and the common broadcasting channel. The receiving apparatus separately receives the broadcasting data and the supplementary data and provides a 3D broadcasting service by descrambling the supplementary data corresponding to the conditional access system. Hereinafter, the descrambling and demultiplexing of the supplementary data in a digital broadcasting system in accordance with an embodiment of the present invention will be described with reference to FIG. 5.

Figure 5:
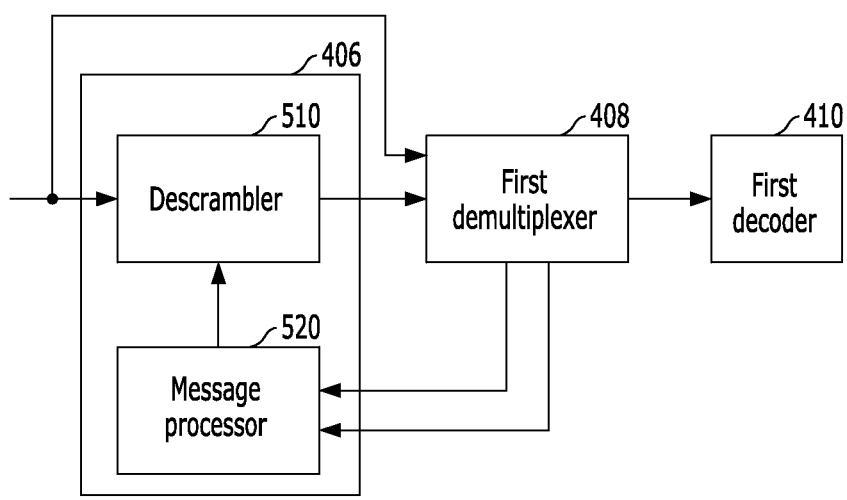
FIG. 5 is a diagram schematically illustrating a supplementary data processor of a receiving apparatus in a communication system in accordance with an embodiment of the present invention.

FIG. 5 is a diagram schematically illustrating a supplementary data processor of a receiving apparatus in a communication system in accordance with an embodiment of the present invention. Here, FIG. 5 schematically illustrates a supplementary data processor for receiving and descrambling the supplementary data of all 3D broadcasting services transmitted through one common channel when the digital broadcasting system in accordance with an embodiment of the present invention provides various types of 3D broadcasting services by applying a conditional access system. The supplementary data processor includes the first processor 406, the demultiplexer 408, and the first decoder 410 of FIG. 4.

Referring to FIG. 5, the supplementary data processor includes the first processor 406 for descrambling and restoring the supplementary data of all 3D broadcasting services transmitted through the common channel, the first demultiplexer 408 for demultiplexing the restored supplementary data from the first processor 406, and the first decoder 410 for decoding the demultiplexed supplementary data from the first demultiplexer 408. The first demultiplexer 408 separates the ECM and the EMM from the supplementary data, which are transmitted through one common channel, through demultiplexing and transmits the ECM and the EMM to the first processor 406.

The demultiplexer 408 demultiplexes the ECM and the EMM transmitted with the supplementary data through the common channel and transmits the demultiplexed ECM and EMM to the first processor 406. The first processor 406 includes a message processor 520 for generating a control word by processing the demultiplexed ECM and EMM, and a descrambler 510 for restoring a transport stream of original supplementary data by descrambling a transport stream of the supplementary data which is scrambled and transmitted using the corresponding ECM and EMM from the transmitter.

Since the transmitting apparatus generates and encodes the ECM and the EMM corresponding to the generated control word for scrambling the supplementary data, multiplexes, and transmits the ECM and the EMM through one common channel, the message processor 520 generates a control word by generating the demultiplexed ECM and EMM from the first demultiplexer 408. The descrambler 510 descrambles the supplementary data using the created control word from the message processor 520 corresponding to the scrambling of the supplementary data using a control word in the transmitting apparatus. The ECM is used for generating a control word, and the EMM is used for a security function such as user authentication.

The first demultiplexer 408 separates supplementary data corresponding to a 3D broadcasting service to be provided to a user from supplementary data for all 3D broadcasting services by demultiplexing the descrambled supplementary data. The first demultiplexer 408 demultiplexes the ECM and the EMM multiplexed and transmitted with the encoded supplementary data through one common channel and transmits the demultiplexed ECM and EMM to the message processor 520.

The first decoder 410 decodes supplement data corresponding to a 3D broadcasting service to be provided to a user and outputs supplement data, right viewpoint image data, or depth information data. The decoded supplementary data is integrally processed with the broadcasting data, thereby providing a 3D broadcasting service to a user. Hereinafter, a data transmission operation for providing various types of 3D broadcasting services by applying a conditional access system in a digital broadcasting system in accordance with an embodiment of the present invention will be described with reference to FIG. 6.

Figure 6:
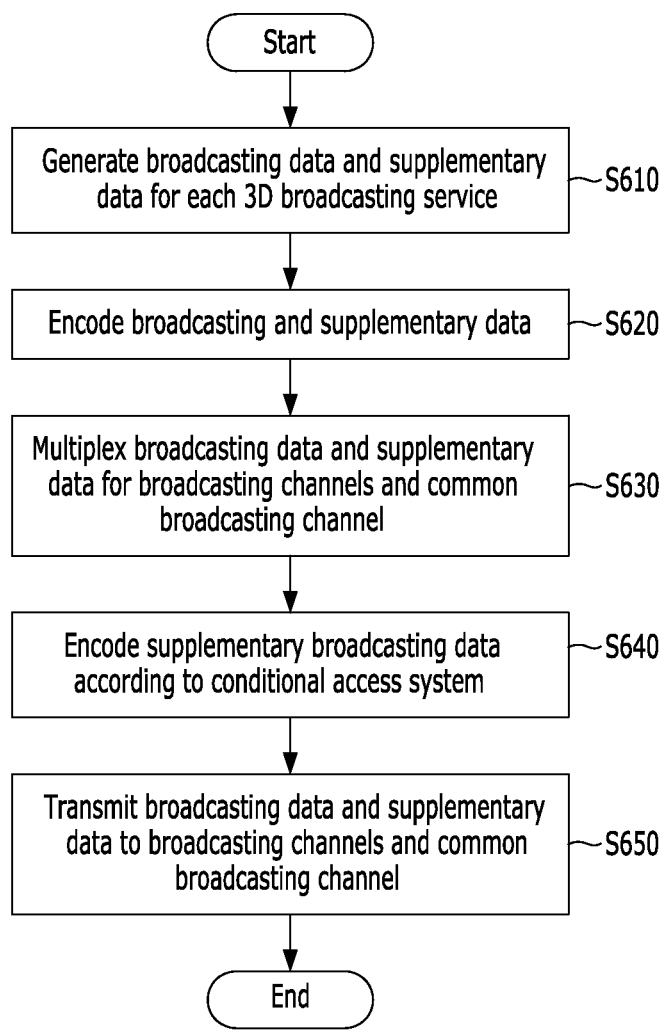
FIG. 6 is a diagram schematically illustrating a data transmission process in a communication system in accordance with an embodiment of the present invention.

FIG. 6 is a diagram schematically illustrating a data transmission process in a communication system in accordance with an embodiment of the present invention. That is, FIG. 6 schematically illustrates a data transmission process when various types of 3D broadcasting services by applying a conditional access system in a digital broadcasting system of a communication system in accordance with an embodiment of the present invention.

Referring to FIG. 6, at step S610, the digital broadcasting system generates broadcasting data and supplementary data for providing 3D broadcasting services by applying a conditional access system. The broadcasting data includes 2D image data such as left viewpoint image as a primary broadcasting image. The supplementary data includes supplementary image for the primary broadcasting image, such as supplementary images to 2D images and depth information for producing 3D images. For example, the supplementary images may be right viewpoint images.

At step S620, the digital broadcasting system encodes the broadcasting data and the supplementary data created per each one of the 3D broadcasting services. At step S630, the broadcasting data is multiplexed for broadcasting channels respectively allocated to 3D broadcasting services and the supplementary data for all 3D broadcasting services are multiplexed for one common channel. The digital broadcasting system separately multiplexes the broadcasting data and the supplementary data in order to provide various types of 3D broadcasting services and multiplexes supplementary data for all 3D broadcasting services, for example, a plurality of supplementary data from a plurality of transmitters, to one common broadcasting channel.

At step S640, the digital broadcasting system encodes the supplementary data corresponding to the conditional access system. Here, the supplementary data of all 3D broadcasting services provided by the digital broadcasting system is scrambled and encoded through a control word according to the conditional access system. Here, the digital broadcasting system creates an ECM and an EMM corresponding to the control word, encodes the created ECM and EMM, and multiplexes the encoded ECM and EMM for one common channel.

At step S650, the digital broadcasting system encodes and modulates the broadcasting data, and transmits the broadcasting data through broadcasting channels allocated to each 3D broadcasting service. Further, the digital broadcasting system encodes and modulates the supplementary data, and transmits the supplementary data through one common broadcasting channel for all 3D broadcasting services through an antenna. Here, the multiplexed ECM and EMM are transmitted through the one common broadcasting channel with the supplementary data.

As described above, the broadcasting data and the supplementary data are separately processed for various types of 3D broadcasting services in the digital broadcasting system in accordance with an embodiment of the present invention. In other words, the broadcasting data is multiplexed for each broadcasting channel allocated to each 3D broadcasting service and transmitted to the corresponding broadcasting channel. The supplementary data is multiplexed for one common broadcasting channel for all 3D broadcasting services and transmitted through the one common broadcasting channel. Here, the supplementary data is transmitted after being encoded corresponding to a control word corresponding to a conditional access system. Hereinafter, a data receiving operation for providing various types of 3D broadcasting service by applying a conditional access system in a digital broadcasting system in accordance with an embodiment of the present invention will be described with reference to FIG. 7.

Figure 7:
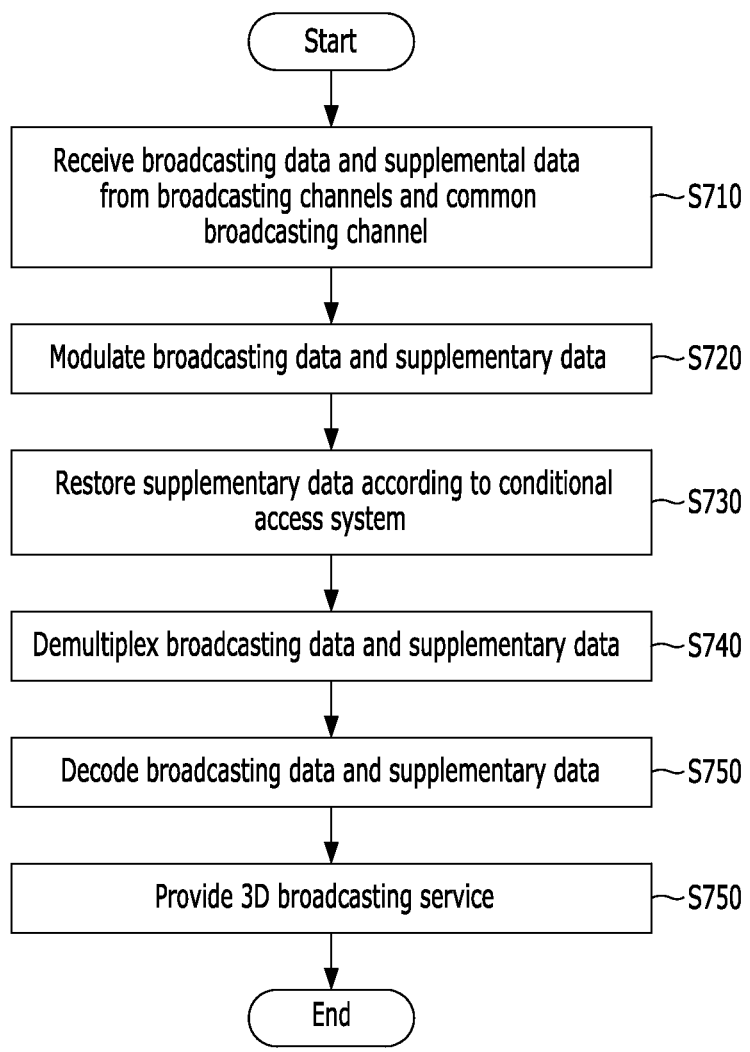
FIG. 7 is a diagram schematically illustrating a data receiving procedure in a communication system in accordance with an embodiment of the present invention.

FIG. 7 is a diagram schematically illustrating a data receiving procedure in a communication system in accordance with an embodiment of the present invention. Here, FIG. 7 schematically illustrates a data receiving procedure when various 3D broadcasting services are provided by applying a conditional access system in a digital broadcasting system of a communication system in accordance with an embodiment of the present invention.

Referring to FIG. 7, at step S710, the receiving apparatus of the digital broadcasting system receives broadcasting data transmitted through broadcasting channels respectively allocated to 3D broadcasting services and receives supplementary data transmitted through one common broadcasting channel for all 3D broadcasting services.

At step S720, the receiving apparatus demodulates the broadcasting data and the supplementary data. At step S730, the receiving apparatus restores the supplementary data corresponding the conditional access system applied to the digital broadcasting system. Here, the receiving apparatus creates a control word by demodulating and processing an ECM and an EMM transmitted together with the supplementary data through the one common broadcasting channel. Then, the receiving apparatus restores the supplementary data by descrambling the encoded supplementary data using the generated control word.

At step S740, the receiving apparatus demodulates the broadcasting data and the supplementary data. At step S750, the receiving apparatus restores the broadcasting data and the supplementary data. Here, the decoded broadcasting data may be 2D image data or left viewpoint image data for a 3D broadcasting service. The decoded supplementary data may be right viewpoint image data or depth information data for 3D broadcasting service. At step S760, the receiving apparatus integrates the broadcasting data and the supplementary data, for example, 2D image data or left viewpoint image data and left viewpoint image data or depth information data to provide the corresponding 3D broadcasting service to the user.

As described above, the digital broadcasting system in accordance with an embodiment of the present invention separately process broadcasting data transmitted through corresponding broadcasting channels and supplementary data transmitted through one common broadcasting channel from a plurality of transmitters providing various types of 3D broadcasting services by applying a conditional access system. In other words, the broadcasting data received from the broadcasting channel are restored to 2D image data or left viewpoint image data through demodulation and demultiplexing, and the supplementary data received through one common broadcasting channel is restored to right viewpoint image data or depth information data through decoding, restoration according to a conditional access system, demultiplexing, and decoding. Here, the supplementary data is restored through a control word generated by an ECM and an EMM received with the supplementary data from the common broadcasting channel.

The digital broadcasting system in accordance with an embodiment of the present invention transmits and receives broadcasting data for a primary broadcasting service and supplementary data of the broadcasting data through interworking with limited broadcasting channels by applying a conditional access system. Accordingly, the uses of limited broadcasting channel are maximized, and the broadcasting service is effectively provided to users subscribed to a corresponding broadcasting service. Further, the digital broadcasting system in accordance with an embodiment of the present invention enables a plurality of broadcasting service providers to provide various types of high quality 3D broadcasting services through limited broadcasting channels. Accordingly, the digital broadcasting system in accordance with an embodiment of the present invention can satisfy the demand of use for receiving high quality broadcasting services.

The embodiments of the present invention described above can be realized as a program and stored in a computer-readable recording medium such as CD-ROM, RAM, ROM, floppy disks, hard disks, magneto-optical disks and the like. Since the process can be easily implemented by those skilled in the art to which the present invention pertains, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting data in a communication system, comprising:
   a plurality of primary source units each configured to generate broadcasting data for corresponding one of predetermined 3D broadcasting services to be provided to a user;
   a plurality of supplementary source units each configured to generate supplementary data for corresponding one of the predetermined 3D broadcasting services;
   a plurality of first multiplexers each configured to multiplex corresponding one of the generated broadcasting data for a corresponding broadcasting channel allocated to corresponding one of the predetermined 3D broadcasting services;
   a second multiplexer configured to multiplex the generated supplementary data for one common broadcasting channel commonly allocated to the predetermined 3D broadcasting services;
   an encoder configured to encode the multiplexed supplementary data corresponding to a conditional access system;
   a plurality of first transmitters each configured to transmit corresponding one of the multiplexed broadcasting data to corresponding one of the allocated broadcasting channels; and
   a second transmitter configured to transmit the encoded supplementary data to the one common broadcasting channel.

2. The apparatus of claim 1, wherein the encoder includes:
   a control word generator configured to generate a control word for the supplementary data corresponding to the conditional access system; and
   a scrambler configured to encode the multiplexed supplementary data by scrambling the multiplexed supplementary data using the control word.

3. The apparatus of claim 2, wherein the encoder includes:
   a message encoder configured to generate an entitlement control message (ECM) and an entitlement management message (EMM) corresponding to the control word.

4. The apparatus of claim 3, wherein the second multiplexer multiplexes the encoded ECM and the encoded EMM for the one common broadcasting channel, and wherein the second transmitter transmits the multiplexed ECM and the multiplexed EMM through the one common broadcasting channel.

5. The apparatus of claim 1, wherein the plurality of primary source units, the plurality of supplementary source units, the plurality of first multiplexers, and the plurality of first transmitters are included respectively corresponding to the predetermined 3D broadcasting services to be provided to the users.

6. The apparatus of claim 1, wherein the second multiplexer, the encoder, and the second transmitter integrally process the supplementary data for all of the predetermined 3D broadcasting services to be provided to the user.

7. The apparatus of claim 1, wherein the broadcasting data is 2D image data or a left (or right) viewpoint image data as primary image for the predetermined 3D broadcasting services; and wherein the supplementary data is a right (or left) viewpoint image data or depth information data as supplementary image for the predetermined 3D broadcasting services.

8. An apparatus for receiving data in a communication system, comprising:

a first Radio Frequency (RF) tuner configured to receive broadcasting data transmitted from a broadcasting channel allocated to corresponding one of predetermined 3D broadcasting services to be provided to a user;

a second RF tuner configured to receive supplementary data transmitted from one common broadcasting channel commonly allocated for the predetermined 3D broadcasting services;

a first processor configured to encode the received supplementary data corresponding to a conditional access system;

a first demultiplexer configured to demultiplex the received broadcasting data;

a second demultiplexer configured to demultiplex the decoded supplementary data;

a plurality of decoders configured to decode the demultiplexed broadcasting data and the demultiplexed supplementary data; and a second processor configured to integrally process the decoded broadcasting data and the decoded supplementary data.

9. The apparatus of claim 8, wherein the first processor includes:

a message processor configured to create a control word by processing an entitlement control message (ECM) and an entitlement management message (EMM) received with the supplementary data through the one common broadcasting channel corresponding to the conditional access system; and a descrambler configured to descramble the received supplementary data using the control word.

10. The apparatus of claim 9, wherein the second demultiplexer configured to demultiplex the ECM and the EMM received through the one common broadcasting channel, and wherein the message processor generates the control word by processing the demultiplexed ECM and EMM.

11. The apparatus of claim 8, wherein the second processor integrates broadcasting data including 2D image data or left (or right) viewpoint image data as primary images for the 3D broadcasting service with supplementary data including right (or left) viewpoint image data or depth information data as supplementary image for the 3D broadcasting services, thereby providing the 3D broadcasting services to a user.

12. The apparatus of claim 8, further comprising:

a controller configured to receive broadcasting data from the broadcasting channels and supplementary data from the one common broadcasting channel, wherein the controller confirms channel information and multiplexing information through Program Specific Information/Service Information (PSI/SI) and control receiving the broadcasting data and the supplementary data using the confirmed channel information and multiplexing information.

13. A method for transmitting data in a communication system, comprising:

generating broadcasting data and supplementary data for a plurality of predetermined 3D broadcasting services to be provided to users;

multiplexing the generated broadcasting data for broadcasting channels respectively allocated to the plurality of predetermined 3D broadcasting services, and multiplexing the generated supplementary data for one commonly broadcasting channel commonly allocated to the plurality of predetermined 3D broadcasting services;

encoding the multiplexed supplementary data corresponding to a conditional access system; and transmitting the encoded supplementary data to the one common broadcasting channel, and transmitting the multiplexed broadcasting data to the allocated broadcasting channels.

14. The method of claim 13, wherein in said encoding the multiplexed supplementary data, a control word is generated for the supplementary data corresponding to the conditional access system and the multiplexed supplementary data is encoded by scrambling the multiplexed supplementary data using the generated control word.

15. The method of claim 14, wherein said encoding the multiplexed supplementary data includes:

generating and encoding an entitlement control message (ECM) and an entitlement management message (EMM) corresponding to the control word, wherein the ECM and the EMM are multiplexed for the one common broadcasting channel and transmitted through the one common broadcasting channel.

16. The method of claim 13, wherein the broadcasting data is 2D image data or left viewpoint (or right viewpoint) image data as primary image for the 3D broadcasting services, and wherein the supplementary data is right viewpoint (or left viewpoint) image data or depth information data as supplementary image for the 3D broadcasting services.

17. A method for receiving data in a communication system, comprising:

receiving broadcasting data transmitted from broadcasting channels respectively allocated to a plurality of predetermined 3D services to be provided to users, and receiving supplementary data transmitted through one common broadcasting channel for the 3D broadcasting services;

restoring the received supplementary data corresponding to a conditional access system;

demultiplexing the received broadcasting data and the restored supplementary data; and decoding the demultiplexed broadcasting data and supplementary data, and providing the plurality of 3D broadcasting services by integrally processing the decoded broadcasting data and supplementary data.

18. The method of claim 17, wherein in said restoring the received supplementary data, a control word is generated by processing an entitlement control message (ECM) and an entitlement management message (EMM) received with the supplementary data through the one common broadcasting channel corresponding to the conditional access system, and the received supplementary data is restored by descrambling the received supplementary data using the generated control word.

19. The method of claim 18, wherein in said demultiplexing, the ECM and the EMM received through the one common broadcasting channel is demultiplexed, and wherein in said restoring, the control word is generated by processing the demultiplexed EMC and EMM.

20. The method of claim 17, wherein in said providing the plurality of predetermined 3D broadcasting services, broadcasting data including 2D image data or left viewpoint (or right viewpoint) image data as primary image for the plurality of predetermined 3D broadcasting services is integrated with supplementary data including right viewpoint (or left viewpoint) image data or depth information data as supplementary image for the plurality of predetermined 3D broadcasting services.

* * * * *